US009769266B2

(12) United States Patent
Stuntebeck

(10) Patent No.: US 9,769,266 B2
(45) Date of Patent: *Sep. 19, 2017

(54) CONTROLLING ACCESS TO RESOURCES ON A NETWORK

(71) Applicant: SkySocket, LLC, Atlanta, GA (US)

(72) Inventor: Erich Stuntebeck, Marietta, GA (US)

(73) Assignee: AirWatch LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/197,385

(22) Filed: Mar. 5, 2014

(65) Prior Publication Data

US 2014/0189119 A1 Jul. 3, 2014

Related U.S. Application Data

(63) Continuation of application No. 13/316,073, filed on Dec. 9, 2011, now Pat. No. 8,713,646.

(51) Int. Cl.
H04L 29/08 (2006.01)
H04L 29/06 (2006.01)

(52) U.S. Cl.
CPC .............. H04L 67/16 (2013.01); H04L 63/08 (2013.01); H04L 63/10 (2013.01)

(58) Field of Classification Search
CPC . H04L 63/08; H04L 63/0807; H04L 63/0876; H04L 63/10; H04L 63/102
USPC .......................................................... 726/4
See application file for complete search history.

(56) References Cited

U.S. PATENT DOCUMENTS

| 8,776,168 | B1* | 7/2014 | Gibson | H04L 63/102 709/225 |
| 2004/0181687 | A1* | 9/2004 | Nachenberg | G06F 21/567 726/30 |
| 2005/0246767 | A1* | 11/2005 | Fazal | H04L 63/065 726/11 |
| 2007/0220417 | A1 | 9/2007 | Mathew et al. | |
| 2008/0134296 | A1* | 6/2008 | Amitai | H04L 63/102 726/4 |
| 2008/0134305 | A1* | 6/2008 | Hinton et al. | 726/5 |
| 2008/0137593 | A1* | 6/2008 | Laudermilch | H04W 48/02 370/328 |
| 2008/0228772 | A1 | 9/2008 | Plamondon | |
| 2008/0301760 | A1 | 12/2008 | Lim | |
| 2009/0260064 | A1 | 10/2009 | McDowell et al. | |
| 2010/0325710 | A1* | 12/2010 | Etchegoyen | G06F 21/31 726/7 |
| 2010/0333166 | A1* | 12/2010 | Herrod | H04L 41/0813 726/1 |

(Continued)

OTHER PUBLICATIONS

Non-Final Office Action mailed Dec. 2, 2014 for U.S. Appl. No. 13/891,612.

(Continued)

*Primary Examiner* — Khang Do

(57) ABSTRACT

Control of access to resources on a network may be provided. A request to access enterprise resource(s), the request comprising a set of user access credentials and a device identifier, may be generated. The request to access the at least one enterprise resource and an updated device profile may be provided to an authorization service. A set of enterprise access credentials may be received from the authorization service and used to generate a second request to access the enterprise resource(s).

20 Claims, 4 Drawing Sheets

(56) References Cited

U.S. PATENT DOCUMENTS

| | | |
|---|---|---|
| 2011/0099255 A1* | 4/2011 | Srinivasan et al. ........... 709/221 |
| 2011/0185181 A1* | 7/2011 | Lin ........................ H04L 63/08 |
| | | 713/176 |
| 2011/0202987 A1* | 8/2011 | Bauer-Hermann et al. ...... 726/7 |
| 2012/0036552 A1 | 2/2012 | Dare et al. |
| 2013/0018939 A1* | 1/2013 | Chawla .................. H04L 67/08 |
| | | 709/203 |
| 2013/0074142 A1 | 3/2013 | Brennan et al. |
| 2014/0189782 A1 | 7/2014 | Mendelovich et al. |

OTHER PUBLICATIONS

Final Office Action mailed Jun. 3, 2015 for U.S. Appl. No. 13/891,612.
Response to Office Action mailed Apr. 22, 2016 for U.S. Appl. No. 13/891,612.
Office Action mailed Aug. 24, 2016 for U.S. Appl. No. 13/891,612.

* cited by examiner

CONTROLLING ACCESS TO RESOURCES ON A NETWORK

RELATED APPLICATIONS

This application is a Continuation of application Ser. No. 13/316,073, entitled "CONTROLLING ACCESS TO RESOURCES ON A NETWORK", filed on Dec. 9, 2011, now issued as U.S. Pat. No. 8,713,646, which is hereby incorporated by reference in its entirety.

BACKGROUND

Controlling access to enterprise resources by network-connected devices is critical to ensure that only authenticated and authorized users and devices gain access to sensitive information or services. To date, this has typically been accomplished by utilizing network firewalls, reverse proxy servers with authentication, and encrypted VPN tunnels. Today, however, enterprise resources are being moved out of enterprise-managed data centers and into the "Cloud." These Cloud-based network environments may not provide the configurability and customization necessary to sufficiently protect enterprise resources. For instance, protecting enterprise-managed data centers at a device level can be problematic. Cloud-based data services often do not provide the necessary features to allow enterprises to control access to the service at a device level, but rather permit access, without restriction as to any device, with proper user-level access controls.

BRIEF DESCRIPTION OF THE DRAWINGS

Many aspects of the present disclosure can be better understood with reference to the following diagrams. The components in the drawings are not necessarily to scale, emphasis instead being placed upon clearly illustrating certain features of the disclosure. Moreover, in the drawings, like reference numerals designate corresponding parts throughout the several views.

DETAILED DESCRIPTION

Disclosed are various embodiments for a system and associated devices and methods for controlling access to enterprise resources. The exemplary system comprising a proxy server and a compliance server, which authorize and authenticate devices for granting access to the enterprise resources based in part on device identifiers and access credentials. In one embodiment, an enterprise device serves up enterprise resources to users if the user provides the appropriate enterprise access credentials. However, certain devices from which users may access the enterprise resources may not qualify to access data in the enterprise device. Thus, even though the user may have user-level access, insufficient device-level access may prevent the user from accessing the enterprise resources. A proxy service authenticates the user and the wireless device from which the user requests the access based on one or more user access credentials and a unique device identifier associated with the wireless device. The proxy service may then communicate with a compliance service to authorize the wireless device by determining whether the wireless device complies with hardware, software, device management restrictions, and the like, defined in a set of compliance rules. Upon authenticating and authorizing both the user and the wireless device, the proxy server then associates the user's access request with enterprise access credentials and facilitates the access to the enterprise resource.

Figure 1:
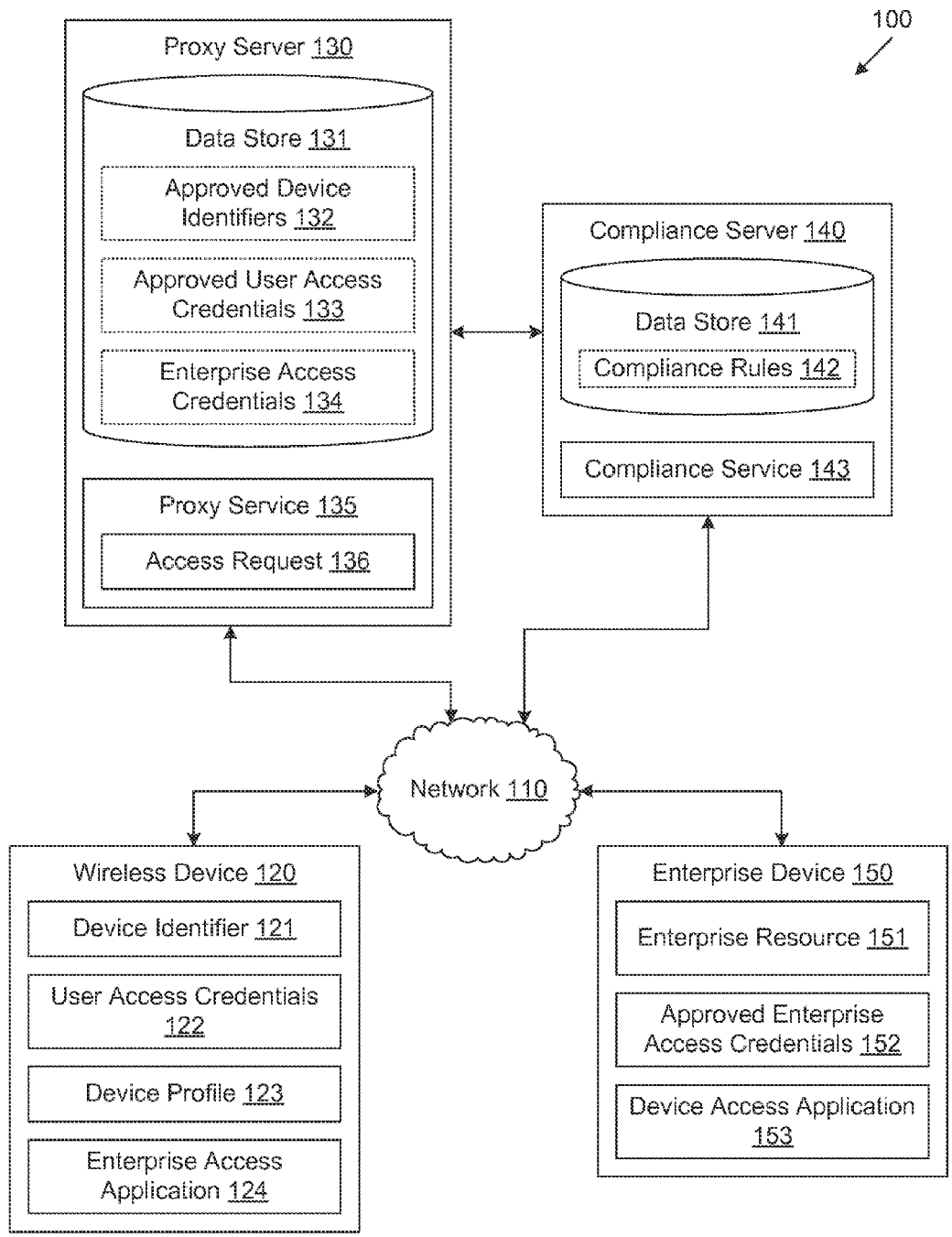
FIG. 1 is a block diagram of a networked environment according to certain exemplary embodiments of the present disclosure.

FIG. 1 illustrates a networked environment 100 according to various embodiments. The networked environment 100 includes a network 110, a wireless device 120, a proxy server 130, a compliance server 140, and an enterprise device 150. The network 110 includes, for example any type of wireless network such as a wireless local area network (WLAN), a wireless wide area network (WWAN), or any other type of wireless network now known or later developed. Additionally, the network 110 includes the Internet, intranets, extranets, microwave networks, satellite communications, cellular systems, PCS, infrared communications, global area networks, or other suitable networks, etc., or any combination of two or more such networks. Embodiments of the present invention are described below in connection with WWANs (as illustrated in FIG. 1); however, it should be understood that embodiments of the present invention may be used to advantage in any type of wireless network.

In one embodiment, the network 110 facilitates the transport of data between one or more client devices, such as wireless device 120, the proxy server 130, the compliance server 140, and the enterprise device 150. Other client devices may include a desktop computer, a laptop computer, a personal digital assistant, a cellular telephone, a set-top step, music players, web pads, tablet computer systems, game consoles, and/or other devices with like capability. Wireless device 120 comprises a wireless network connectivity component, for example, a PCI (Peripheral Component Interconnect) card, USB (Universal Serial Bus), PCMCIA (Personal Computer Memory Card International Association) card, SDIO (Secure Digital Input-Output) card, NewCard, Cardbus, a modem, a wireless radio transceiver, and/or the like. Additionally, the wireless device 120 may include a processor for executing applications and/or services, and a memory accessible by the processor to store data and other information. The wireless device 120 is operable to communicate wirelessly with the proxy server 130 and the enterprise device 150 with the aid of the wireless network connectivity component.

Additionally, the wireless device 120 may store in memory a device identifier 121, user access credentials 122, a device profile 123, and potentially other data. In one embodiment, the device identifier 121 may include a software identifier, a hardware identifier, and/or a combination of software and hardware identifiers. For instance, the device identifier 121 may be a unique hardware identifier such as a MAC address, a CPU ID, and/or other hardware identifiers. The user access credentials 122 may include a username, a password, and/or biometric data related to facial recognition, retina recognition, fingerprint recognition, and the like. Additionally, the device profile 123 may include a listing of hardware and software attributes that describe the wireless device 120. For instance, the device profile 123 may include hardware specifications of the wireless device 120, version information of various software installed on the wireless device 120, and/or any other hardware/software attributes. Additionally, the device profile 123 may also include data indicating a date of last virus scan, a date of last access by IT, a date of last tune-up by IT, and/or any other data indicating a date of last device check.

The wireless device 120 may further be configured to execute various applications such as an, and an enterprise access application 124. The enterprise access application 124 may be executed to transmit a request for access to the enterprise resources 151 available on the enterprise device 150. The wireless device 120 may be configured to execute client side applications such as, for example, a browser, email applications, instant message applications, and/or other applications. For instance, the browser may be executed in the wireless device 120, for example, to access and render network pages, such as web pages, or other network content served up by proxy server 130, the compliance server 140, the enterprise device 150, and/or any other computing system.

In one embodiment, the enterprise device 150 represents an enterprise level computing device that stores and serves up enterprise resources 151, and/or performs other enterprise level functions. For instance, the enterprise device 150 may store in memory enterprise resources 151, a listing of approved enterprise access credentials 152, and potentially other data. The enterprise resources 151 may be stored in the device, a database accessible by the device, and/or other storage facility in data communication with the enterprise device 150. In one embodiment, the enterprise resources 151 may include any type of enterprise data, such as, for instance, enterprise documents, files, file systems, and/or any other type of data. In another embodiment, the enterprise resource 151 may include enterprise level applications and services that may be accessed and executed on an accessing device. For instance, a user operating the accessing device (e.g., wireless device 120) may invoke the enterprise level application that is then executed on the accessing device. The listing of approved enterprise access credentials 152 may be a list of pre-approved enterprise access credentials that provide access to the enterprise resources 151.

The enterprise device 150 may further be configured to execute various applications such as a device access application 153. The device access application 153 may be executed to receive a request for access to the enterprise resources 151 and determine whether to grant the requested access. For instance, the device access application 153 may receive the request for access from the wireless device 120, the proxy server 130, the compliance server 140, and/or any other computing system. In response, the device access application 153 may then determine whether the enterprise access credentials associated with the requesting device match one or more of the credentials included in the listing of approved enterprise access credentials 152. Based on this determination, the device access application 153 may grant the request device with access to the enterprise resources 151. The enterprise device 150 may be configured to execute other enterprise side applications and/or services such as, a mail service, an internet service, a messaging service, and/or other services.

The proxy server 130 and the compliance server 140 can be implemented as, for example, a server computer or any other system capable of providing computing capability. Further, the proxy server 130 may be configured with logic for performing the methods described herein. Although one proxy server 130 and one compliance server 140 is depicted, certain embodiments of the networked environment 100 include more than one proxy server 130 and compliance server 140. One or more of the servers may be employed and arranged, for example, in one or more server banks or computer banks or other arrangements. For example, the server computers together may include a cloud computing resource, a grid computing resource, and/or any other distributed computing arrangement. Such server computers may be located in a single installation or may be distributed among many different geographical locations. For purposes of convenience, the proxy server 130 and the compliance server 140 are referred to herein in the singular.

Various applications and/or other functionality may be executed in the proxy server 130 and the compliance server 140, respectively, according to certain embodiments. Also, various data is stored in a data store 131 that is accessible to the proxy server 130 and/or a data store 141 accessible to the compliance server 140. The data stored in each of the data stores 131 and 141, for example, may be accessed, modified, removed, and/or otherwise manipulated in association with the operation of the applications and/or functional entities described herein.

The components executed in the proxy server 130 include a proxy service 135, and may include other applications, services, processes, systems, engines, or functionality not discussed in detail herein. As used herein, the term "proxy service" is meant to generally refer to computer-executable instructions for performing the functionality described herein for authenticating user access credentials and device identifiers. The proxy service 135 is executed to receive an access request 136 from a wireless device 120 for accessing enterprise resources 151 and to determine whether to grant or deny the access request 136. Upon determining to grant the access request 136, the proxy service 135 may then associate the wireless device 120 with necessary enterprise access credentials to access the enterprise resource 151, as will be described.

The data stored in data store 131 may include, for example, approved device identifiers 132, approved user access credentials 133, approved enterprise access credentials 134, and potentially other data. The approved device identifiers 132 represents a listing of device identifiers 121 that have been pre-approved for accessing the enterprise resources 151 in the enterprise device 150. For instance, the approved device identifiers 132 may have been previously provided to the proxy server 130. The approved user access credentials 133 represents a listing of user access credentials 122 that have been pre-approved for accessing the enterprise resources 151 of the enterprise device 150. Additionally, the enterprise access credentials 134 may provide access to the enterprise resources 151 when associated with the access request 136.

The components executed in the compliance server 140 include a compliance service 143, and may include other applications, services, processes, systems, engines, or functionality not discussed in detail herein. As used herein, the term "compliance service" is meant to generally refer to computer-executable instructions for performing the functionality described herein for authorizing the device characteristics of the requesting device. The compliance service 143 is executed to determine whether the device characteristics of the wireless device 120 comply with the compliance rules 142 that are stored in the data store 141. For instance, the compliance service 143 may identify the device characteristics from the device profile 123 of each wireless device 120. Additionally, the compliance rules 142 represents a listing of hardware restrictions, software restrictions, and/or mobile device management restrictions that need to be satisfied by the wireless device 120.

In one embodiment, hardware restrictions included in the compliance rules 142 may comprise restrictions regarding use of specific wireless devices 120 and specific wireless device features, such as, for instance, cameras, Bluetooth, IRDA, tethering, external storage, a mobile access point, and/or other hardware restrictions. Software restrictions included in the compliance rules 142 may comprise restrictions regarding the use of specific wireless device operating systems or applications, internet browser restrictions, screen capture functionality, and/or other software restrictions. Mobile device management restrictions included in the compliance rules 142 comprise encryption requirements, firmware versions, remote lock and wipe functionalities, logging and reporting features, GPS tracking, and/or other mobile device management features.

The compliance service 143 may determine whether the device characteristics of a requesting device (e.g. wireless device 120) satisfy one or more of the restrictions enumerated in the compliance rules 142. For example, the compliance service 143 may determine that a requesting device that has a camera, Bluetooth capability, and is executing a specified version of an operating system is compliant with the compliance rules 142. As another example, the compliance service 143 may determine that a requesting device that is associated with an external storage unit and has screen capture functionality enabled is not compliant with the compliance rules 142.

A user operating a wireless device 120 may wish to access data or another resource on the enterprise device 150, such as enterprise resources 151. In one embodiment, the user may manipulate a network page rendered on a display associated with the wireless device 120 to transmit the access request 136 to request access to the enterprise resources 151. In another embodiment, the user may manipulate a user interface generated by a local executed application. The user may provide login information, such as, for instance, a unique user name, a password, biometric data, and/or other types of user access credentials 122 and request to access the enterprise resources 151 stored on the enterprise device 150. The enterprise access application 124 may transmit the access request 136 to access the enterprise resources 151 to the proxy service 135. In another embodiment, the enterprise access application 124 may transmit the request 136 to access the enterprise resources 151 directly to the enterprise device 150. In this embodiment, the device access application 153 receive the request and re-route the request to the proxy server 130.

Upon receiving the request 136, the proxy service 135 determines whether to grant or deny the access request 136. In one embodiment, the proxy service 135 may first authenticate the wireless device 120 and the user operating the wireless device 120. To this end, the proxy service 135 determines whether the device identifier 121 associated with the wireless device 120 matches one of the identifiers listed in the listing of approved identifiers 132. For instance, the device identifier 121 of the wireless device 120 may be included as part of the request 136 transmitted by the enterprise access application 124. In another embodiment, the proxy service 135 may request to receive the device identifier 121 in response to receiving the access request 136. Upon identifying and/or receiving the device identifier 121, the proxy service 135 determines whether the device identifier 121 matches one of the approved identifiers 132 stored in the data store 131. In another embodiment, the proxy service 135 may authenticate the wireless device 120 dynamically by determining whether the device identifier 121 is within a predetermined range of approved device identifiers 132. In yet another embodiment, the proxy service 135 may authenticate the wireless device 120 dynamically by performing an algorithm on the device identifier 121.

Additionally, the proxy service 135 may also authenticate the user operating the wireless device 120 by determining whether the user access credentials 122 associated with the user matches one of the credentials in the listing of approved user access credentials 133. For instance, the user access credentials 122 associated with the user on the wireless device 120 may be included as part of the request 136 transmitted by the enterprise access application 124. In another embodiment, the proxy service 135 may request to receive the user access credentials 122 in response to receiving the access request 136. Upon identifying and/or requesting the user access credentials 122, the proxy service 135 may identify the user access credentials 122 from the request 136 and determine whether the user access credentials 122 matches one of the approved user access credentials 133 stored in the data store 131.

Having authenticated the wireless device 120 and the user operating the wireless device 120, the proxy service 135 communicates with the compliance service 143 to authorize the wireless device 120 for accessing the enterprise resources 151. In one embodiment, the compliance service 143 authorizes the wireless device 120 by determining whether the device characteristics of the wireless device 120 comply with the compliance rules 142. For instance, the compliance service 143 identifies the device characteristics of the wireless device 120 from the device profile 123. The compliance service 143 then analyzes the device characteristics to determine whether the software restrictions, hardware restrictions, and/or device management restrictions defined in the compliance rules 142 are satisfied and returns the result of the determination to the proxy service 135. In an alternative embodiment, the proxy service 135 may determine whether the wireless device 120 complies with the compliance rules 143.

If the proxy service 135 determines or receives a determination that the wireless device 120 is authorized, the proxy service 135 then associates the wireless device 120 with one or more enterprise access credentials 134. In one embodiment, the proxy service 135 modifies the access request 136 transmitted by the enterprise access application 124 by replacing the user access credentials 122 with one or more enterprise access credentials 134. In another embodiment, the proxy service 135 may modify the access request 136 by also replacing the device identifier 121. The proxy service 135 then relays the access request 136 with the approved enterprise access credentials 134 to the enterprise device 150 for processing.

In one embodiment, the device access application 153 in the enterprise device 150 receives the modified access request 136 from the proxy service 135 and serves up the requested enterprise resources 151 to the proxy service 135. For instance, the device access application 153 determines whether the enterprise access credentials 134 inserted to the access request 136 matches one or more of the approved enterprise access credentials 152. Upon determining that the enterprise access credentials 134 match one of the approved enterprise access credentials 152, the device access application 153 serves up the requested quantity of enterprise resources 151. In response, the proxy service 135 relays the requested enterprise resources 151 to the wireless device 120. In another embodiment, the device access application 153 may serve up the requested enterprise resources 151 directly to the wireless device 120.

Figure 2:
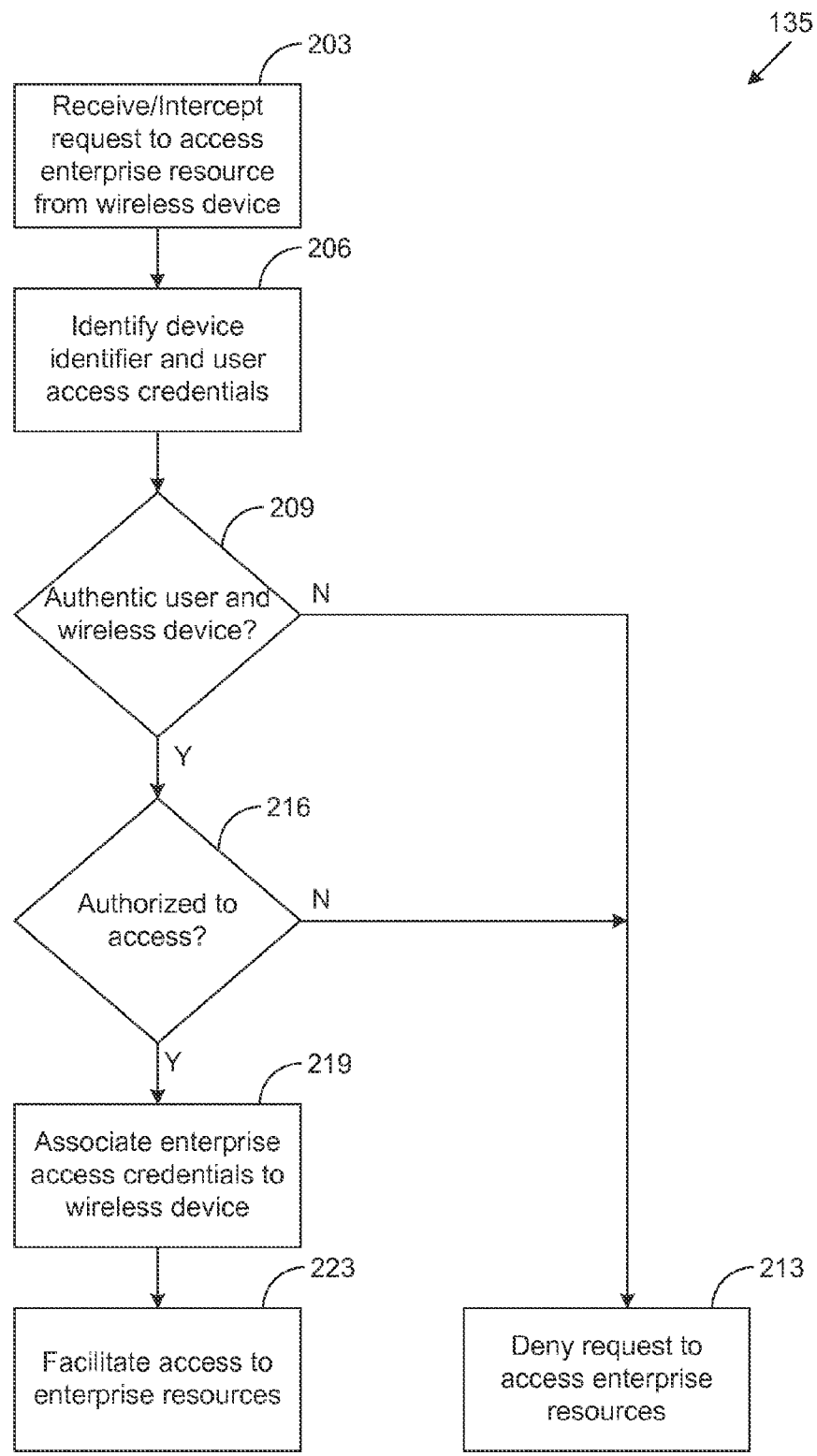
FIG. 2 is a flowchart illustrating exemplary functionality implemented as portions of a proxy service executed by a proxy server in the networked environment of FIG. 1 according to certain embodiments of the present disclosure.

FIG. 2 is a flowchart illustrating an exemplary method performed by a portion of the proxy service 135 according to various embodiments. It is to be understood that the flowchart of FIG. 2 provides merely an example of the many different types of functional arrangements that may be employed to implement the proxy service 135 as described herein.

Beginning with step 203, the proxy service 135 receives an access request 136 (FIG. 1) from the enterprise access application 124 (FIG. 1) executed by a wireless device 120 (FIG. 1) to access enterprise resources 151 (FIG. 1) served up by the enterprise device 150 (FIG. 1). Then, in step 206, the proxy service 135 identifies a device identifier 121 (FIG. 1) associated with the wireless device 120 and the user access credentials 122 (FIG. 1) of the user operating the wireless device 120. In one embodiment, the device identifier 121 and the user access credentials 122 may be received by the proxy service 135 in conjunction with the request 136. In another embodiment, the proxy service 135 may separately request the device identifier 121 and the user access credentials 122 from the wireless device 120.

Next, in step 209, the proxy service 135 determines whether the wireless device 120 and the user operating the wireless device 120 are authentic. In one embodiment, the proxy service 135 determines whether device identifier 121 associated with the wireless device 120 matches one of the identifiers included in the listing of approved device identifiers 132 (FIG. 1). Additionally, the proxy service 135 determines whether the user access credentials 122 associated with the user matches one of the credentials included in the approved user access credentials 133 (FIG. 1). If the proxy service 135 is unable to match either one of the device identifier 121 and the user access credentials 122 with the approved device identifiers 132 and the approved user access credentials 133, respectively, then the proxy service 135 proceeds to step 213 and denies the access request 136 to access the enterprise resources 151.

However, if the proxy service 135 matches both the device identifier 121 and the user access credentials 122 with the approved device identifiers 132 and the approved user access credentials 133, respectively, then the proxy service 135 proceeds to step 216. In step 216, the proxy service 135 determines whether the wireless device 120 is authorized to access the requested enterprise resources 151. As mentioned, the proxy service 135 may communicate with the compliance service 143 to determine whether the wireless device 120 is authorized to access the enterprise resources 151 on the enterprise device 150, as described above. If the proxy service 135 determines that the wireless device 120 is not authorized, then the proxy service proceeds to step 213 and denies the request 136 to access the enterprise resources 151.

However, if the proxy service 135 determines that the wireless device 120 is authorized to access the enterprise resources 151, then the proxy service proceeds to step 219. In step 219, the proxy service 135 associates one set of enterprise access credentials 134 (FIG. 1) with the access request 136. For instance, the proxy service 135 may modify the original access request 136 transmitted by the enterprise access application 124 to remove the user access credentials 122 and insert the enterprise access credentials 134.

Then, in step 223, the proxy service 135 facilitates accessing the enterprise resources 121 for the wireless device 120. In one embodiment, the proxy service 135 relays the modified access request 136 to the device access application 153 of the enterprise device 150. In response, the proxy service 135 may receive the requested enterprise resources 151 from the device access application 153 if the enterprise access credentials 134 match one of the approved enterprise access credentials 152. Upon receiving the requested enterprise resources 151, the proxy service 135 may communicate to the requested enterprise resources 151 to the enterprise access application 124. In another embodiment, the device access application 153 may communicate the requested enterprise resources 151 directly to the enterprise access application 124.

Figure 3:
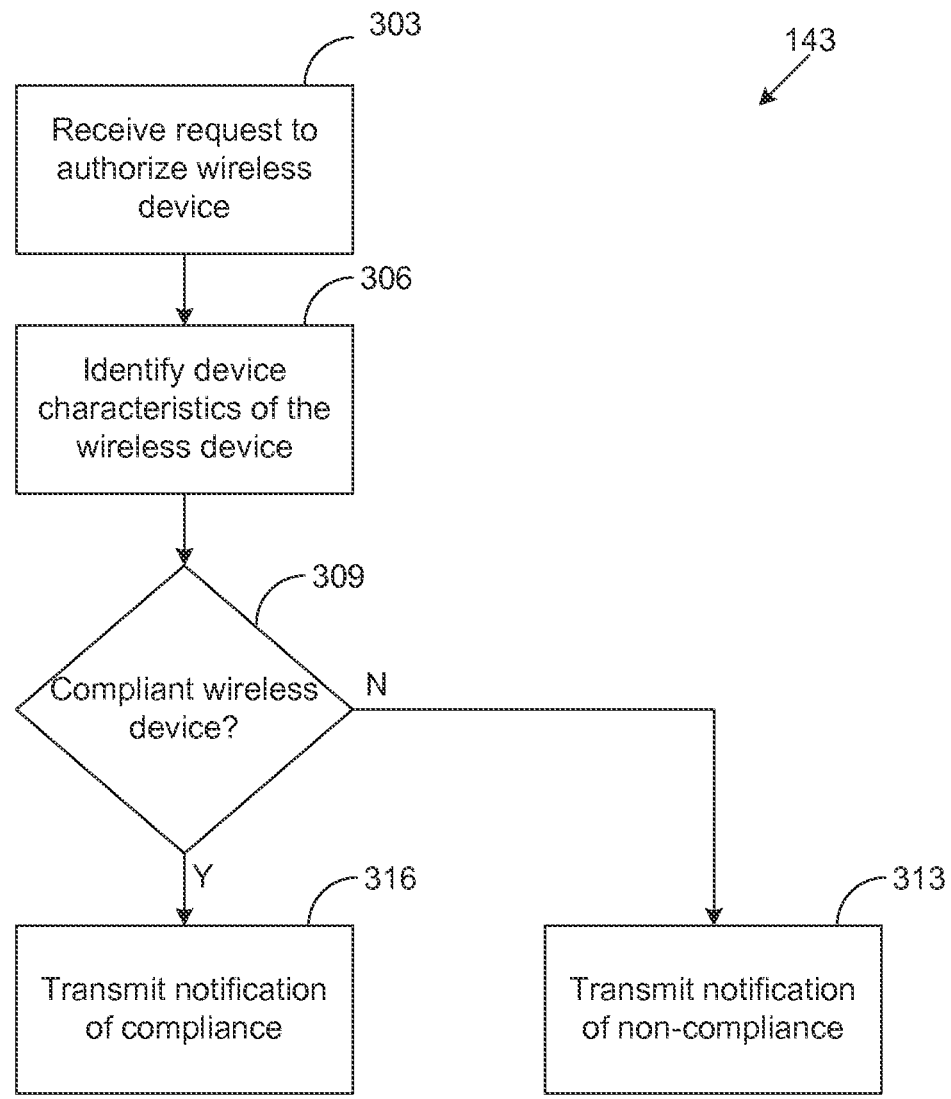
FIG. 3 is a flowchart illustrating exemplary functionality implemented as portions of a compliance service executed by a compliance server in the networked environment of FIG. 1 according to certain embodiments of the present disclosure.

FIG. 3 is a flowchart illustrates an example of a method performed by compliance service 143 according to certain embodiments. It is to be understood that the flowchart of FIG. 3 provides merely an example of the many different types of functional arrangements that may be employed to implement the compliance service 143 as described herein.

Beginning with step 303, the compliance service 143 receives a request from the proxy service 135 (FIG. 1) to authorize a wireless device 120 (FIG. 1) for accessing enterprise resources 151 (FIG. 1) served up by the enterprise device 150 (FIG. 1). Then, in step 306, the compliance service 143 identifies the device characteristics of the wireless device 120 (FIG. 1). For instance, the compliance service 143 may determine the device characteristics from the device profile 123 (FIG. 1) of the wireless device 120. In one embodiment, the compliance service 143 may receive the device profile 123 from the proxy service 135 in conjunction with the access request 136. In another embodiment, the compliance service 143 may transmit a request to the wireless device 120 to receive the device profile 123. In yet another embodiment, the device profile 123 of each wireless device 120 in the networked environment 100 (FIG. 1) may be stored in the data store 141 (FIG. 1) of the compliance server 140. In this embodiment, the compliance service 143 may access the local copy of the device profile 123. Further, the local copy of the device profile 123 may be periodically updated from the respective wireless device 120.

Next, in step 309, the compliance service 143 determines whether the wireless device 120 is complaint with the compliance rules 143 (FIG. 1) and is therefore authorized to access the enterprise resources 151. In one embodiment, the compliance service 143 determines that the wireless device 120 is compliant if the device characteristics of the wireless device 120 satisfy the compliance rules 142 required to access the enterprise device 150. For instance, the compliance rules 142 may comprise hardware restrictions, software restrictions, and device management restrictions. If the compliance service 143 determines that the wireless device 120 is not compliant, then in step 313 the compliance service 143 transmits a notification that the wireless device 120 failed the compliance check. However, if the compliance service 143 determines that the wireless device is compliant, then in step 316 the compliance service 143 transmits a notification to the proxy service 135 that the wireless device 120 passed the compliance check.

Figure 4:
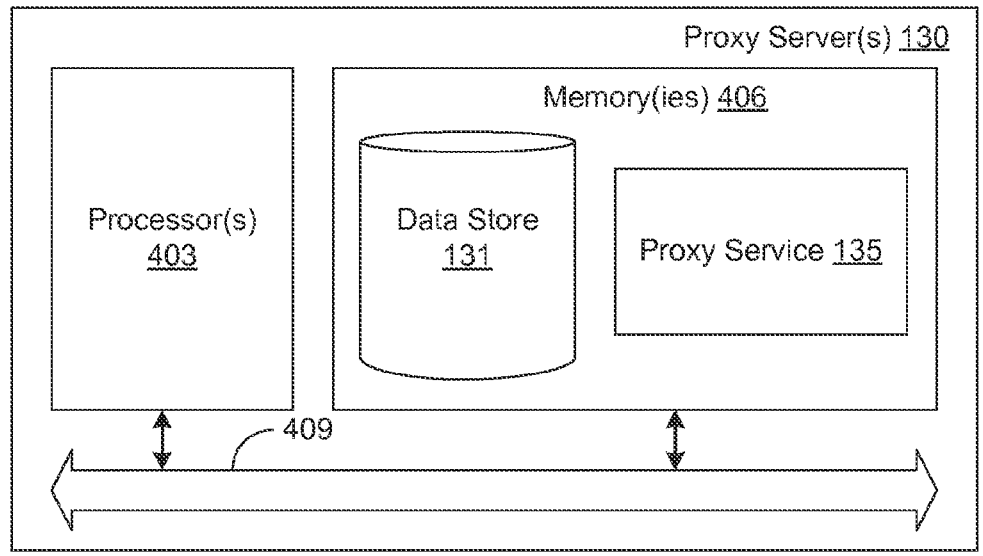
FIG. 4 is a schematic block diagram illustrating a proxy server and compliance server employed in the networked environment of FIG. 1 according to certain embodiments of the present disclosure.
Figure 4:
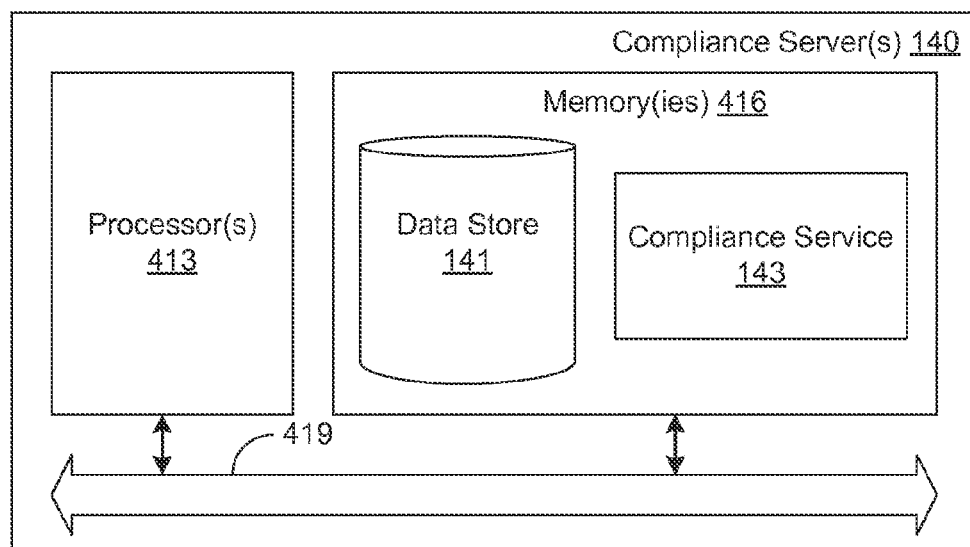

With reference to FIG. 4, shown is a schematic block diagram of the proxy server 130 and the compliance server 140 according to an embodiment of the present disclosure. The proxy server 130 includes at least one processor circuit, for example, having a processor 403 and a memory 406, both of which are coupled to a local interface 409. Additionally, the compliance server 140 includes at least one processor circuit, for example, having a processor 413 and a memory 416, both of which are coupled to a local interface 419 To this end, the proxy server 130 and the compliance server 140 may comprise, for example, at least one server computer or like device. The local interfaces 409 and 419 may comprise, for example, a data bus with an accompanying address/control bus or other bus structure as can be appreciated.

Stored in the memories 406 and 416 are both data and several components that are executable by the processors 403 and 413. In particular, stored in the memory 406/416 and executable by the processors 403 and 413 are a proxy service 135, a compliance service 143, and potentially other applications. Also stored in the memories 406 and 416 may be a data stores 131 and 141 and other data. In addition, an operating system may be stored in the memories 406 and 416 and executable by the processors 403 and 413.

It is to be understood that there may be other applications that are stored in the memories 406 and 416 and are executable by the processors 403 and 413 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memories 406 and 416 and are executable by the processors 403 and 413. In this respect, the term "executable" means a program file that is in a form that can ultimately be run by the processors 403 and 413. Examples of executable programs may be, for example, a compiled program that can be translated into machine code in a format that can be loaded into a random access portion of the memories 406 and 416 and run by the processors 403 and 413, source code that may be expressed in proper format such as object code that is capable of being loaded into a random access portion of the memory 406/416 and executed by the processors 403 and 413, or source code that may be interpreted by another executable program to generate instructions in a random access portion of the memories 406 and 416 to be executed by the processors 403 and 413, etc. An executable program may be stored in any portion or component of the memories 406 and 416 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 406 and 416 is defined herein as including both volatile and nonvolatile memory and data storage components. Volatile components are those that do not retain data values upon loss of power. Nonvolatile components are those that retain data upon a loss of power. Thus, the memories 406 and 416 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 403 and 413 may represent multiple processors, and the memories 406 and 416 may represent multiple memories that operate in parallel processing circuits, respectively. In such a case, the local interfaces 409 and 419 may be an appropriate network 109 (FIG. 1) that facilitates communication between any two of the multiple processors 403 and 413, or between any two of the memories 406 and 416, etc. The local interfaces 409 and 419 may comprise additional systems designed to coordinate this communication, including, for example, performing load balancing. The processors 403 and 413 may be of electrical or of some other available construction.

Although the proxy service 135, the compliance service 143, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the proxy service 135 and the compliance service 143, respectively. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processors 403 and 413 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the proxy service 135 and the compliance service 143, that comprises software or code can be embodied in any non-transitory computer-readable medium for use by or in connection with an instruction execution system such as, for example, a processors 403 and 413 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed:

1. A non-transitory computer-readable medium embodying program instructions executable in a client device that, when executed by the client device, cause the client device to:
   generate a request on the client device to access an enterprise resource from an enterprise device, the request comprising user access credentials and a device identifier corresponding to the client device;
   cause the request to access the enterprise resource to be communicated to a proxy server configured to:
      authenticate a user account of the client device by determining that the user access credentials match approved user access credentials stored in a data store;
      authenticate the client device by determining that the device identifier matches an approved device identifier stored in the data store;
      communicate with a compliance server to determine that the client device complies with at least one compliance rule based at least in part on a device profile generated for the client device;
      associate enterprise access credentials with the client device in response to the client device being authorized by the proxy server and the compliance server to access the enterprise resource;
      modify the request to generate a subsequent request to access the enterprise resource for transmission to the enterprise device by replacing the user access credentials with the enterprise access credentials in response to the enterprise access credentials being associated with the client device, the subsequent request further comprising the device identifier;
      receive the enterprise resource from the enterprise device in response to the subsequent request being received by the enterprise device from the proxy server and the subsequent request being authenticated by the enterprise device using the enterprise access credentials and the device identifier; and
      communicate the enterprise resource to the client device; and
   access the enterprise resource received at the client device from the proxy server.

2. The non-transitory computer-readable medium of claim 1, wherein the user access credentials further comprise login information provided on the client device.

3. The non-transitory computer-readable medium of claim 2, wherein the login information further comprises a user name, a password, biometric data, or a combination thereof.

4. The non-transitory computer-readable medium of claim 1, further comprising program instructions that, when executed by the client device, cause the client device to provide the device profile to the compliance server on a periodic basis.

5. The non-transitory computer-readable medium of claim 4, further comprising program instructions that, when executed, cause the client device to access a notification received from the proxy server that the device profile failed a compliance check performed by the compliance server.

6. The non-transitory computer-readable medium of claim 1, wherein the request to access the enterprise resource on the client device is initiated on the client device via a network page rendered on a display of the client device.

7. The non-transitory computer-readable medium of claim 1, wherein:
   the request to access the enterprise resource on the client device is initiated on the client device via an enterprise access application locally executed on the client device, and
   the request to access the enterprise resource is communicated to the proxy sever by communicating the request to the enterprise device, wherein the enterprise device is configured to reroute the request from the enterprise device to the proxy server.

8. A system, comprising:
   a user device comprising a local data store; and
   program code executable in the user device that, when executed, causes the user device to:
      generate a request to access an enterprise resource from an enterprise device on the user device, the request comprising user access credentials and a device identifier corresponding to the user device; and
      cause the request to access the enterprise resource to be communicated to a proxy server configured to:
         authenticate a user account of the user device by determining that the user access credentials matches approved user access credentials stored in memory;
         authenticate the user device by determining that the device identifier matches an approved device identifier stored in the memory;
         communicate with a compliance server to determine that the user device complies with at least one compliance rule based at least in part on a device profile generated for the user device;
         associate enterprise access credentials with the user device in response to the user device being authorized by the proxy server and the compliance server to access the enterprise resource;

modify the request to generate a subsequent request to access the enterprise resource for transmission to the enterprise device by replacing the user access credentials with the enterprise access credentials in response to the enterprise access credentials being associated with the user device, the subsequent request further comprising the device identifier;

receive the enterprise resource from the enterprise device in response to the subsequent request being received by the enterprise device from the proxy server and the subsequent request being authenticated by the enterprise device using the enterprise access credentials and the device identifier; and communicate the enterprise resource to the user device; and access the enterprise resource received at the user device from the proxy server.

9. The system of claim 8, wherein the user access credentials further comprise login information provided on the user device.

10. The system of claim 9, wherein the login information further comprises a user name, a password, biometric data, or a combination thereof.

11. The system of claim 8, further comprising program code that causes the user device to provide the device profile to the compliance server on a periodic basis.

12. The system of claim 11, further comprising program code that causes the user device to receive a notification from the proxy server that the device profile failed a compliance check performed by the compliance server.

13. The system of claim 8, wherein the request to access the enterprise resource on the user device is initiated on the user device via a network page rendered on a display of the user device.

14. The system of claim 8, wherein:
the request to access the enterprise resource on the user device is initiated on the user device via an enterprise access application locally executed on the user device, and the request to access the enterprise resource is provided to the proxy sever by communicating the request to the enterprise device, wherein the enterprise device is configured to reroute the request from the enterprise device to the proxy server.

15. A method, comprising:
generating, by a client device in data communication with a proxy server over a network, a request to access an enterprise resource from an enterprise device on the client device, the request comprising user access credentials and a device identifier corresponding to the client device; and causing, by the client device, the request to access the enterprise resource to be provided to the proxy server, the proxy server being configured to:

authenticate a user account of the client device by determining that the user access credentials match approved user access credentials stored in a data store;

authenticate the client device by determining that the device identifier matches an approved device identifier stored in the data store; and communicate with a compliance server to determine that the client device complies with at least one compliance rule based at least in part on a device profile generated for the client device;

associate enterprise access credentials with the client device in response to the client device being authorized by the proxy server and the compliance server to access the enterprise resource;

modify the request to generate a subsequent request to access the enterprise resource for transmission to the enterprise device by replacing the user access credentials with the enterprise access credentials in response to the enterprise access credentials being associated with the user device, the subsequent request further comprising the device identifier;

receive the enterprise resource from the enterprise device in response to the subsequent request being received by the enterprise device from the proxy server and the subsequent request being authenticated by the enterprise device using the enterprise access credentials and the device identifier; and communicate the enterprise resource to the client device; and accessing, by the client device, the enterprise resource received from the proxy server.

16. The method of claim 15, wherein the user access credentials further comprise login information provided on the client device.

17. The method of claim 16, wherein the login information further comprises a user name, a password, biometric data, or a combination thereof.

18. The method of claim 15, further comprising causing, by the client device, the device profile to be provided to the compliance server on a periodic basis.

19. The method of claim 15, wherein the request to access the enterprise resource on the client device is initiated on the client device via a network page rendered on a display of the client device.

20. The method of claim 15, wherein:
the request to access the enterprise resource on the client device is initiated on the client device via an enterprise access application locally executed on the client device, and the request to access the enterprise resource is provided to the proxy server by communicating the request to the enterprise device, wherein the enterprise device is configured to reroute the request from the enterprise device to the proxy server.

* * * * *